United States Patent Office 3,649,437
Patented Mar. 14, 1972

3,649,437
THERMOFORMED FOLDING CARTONS
Leon Edward Wolinski, Buffalo, N.Y., and Roland G. Harris, Chadds Ford, Pa., assignors to E. I. du Pont de Nemours and Company, Wilmington, Del.
No Drawing. Continuation-in-part of application Ser. No. 848,206, Aug. 7, 1969. This application Sept. 26, 1969, Ser. No. 861,468
The portion of the term of the patent subsequent to Nov. 9, 1971, has been disclaimed
Int. Cl. B32b 3/26
U.S. Cl. 161—161
2 Claims

ABSTRACT OF THE DISCLOSURE

Thermoformed folding cartons and carton blanks prepared from a laminar structure comprising oriented foam having thermoplastic film bonded to the surfaces thereof.

CROSS-REFERENCE TO RELATED APPLICATION

This is a continuation-in-part of our copending application Ser. No. 848,206, filed Aug. 7, 1969.

BACKGROUND OF THE INVENTION

Despite the widespread use of paperboard in the packaging industry, certain limitations in its utility have long been recognized. For example, paperboard packages are weakened by moisture and are not impervious to greases and oils. Consequently, when packaging certain types of foods and cosmetics, paperboard packages generally require a secondary wrap for the packaged article to preserve the integrity and appearance of the package. Other physical characteristics of paperboard have limited the forms of the package and the types of surface treatment which could be used on paperboard packaging materials, since paperboard cannot be thermoformed or deeply embossed.

Previous attempts to overcome these inherent limitations have included laminations of various waterproof coatings onto paperboard so as to enable it to withstand grease and moisture. Paper itself has also been bonded onto certain foam materials to improve the cushioning qualities of the packaging materials, as illustrated in U.S. Pat. 2,770,406. Still other attempts to prepare economical packaging materials include laminated foam structures as described in Cowman, U.S. Pat. 3,229,814. Laminated structures prepared according to the Cowman specification comprise a sandwich of thermoplastic film on either side of a foam of expanded polystyrene beads. While these structures are relatively impervious to moisture and greases, they are of limited applicability in that they do not exhibit the structural integrity necessary for use in cartons.

SUMMARY OF THE INVENTION

The instant invention provides thermoformed folding cartons and carton blanks which exhibit a unique packaging versatility and unusual structural strength. Specifically, the instant invention provides folding cartons consisting essentially of a laminated structure comprising (a) A core of oriented closed cell foam having an elongation of less than about 50% and consisting essentially of styrene polymer having a tensile modulus greater than 150,000 p.s.i., and (b) Thermoplastic film having a tensile modulus greater than 150,000 p.s.i. and thermoformable within a temperature of about from 50° to 230° C., bonded to both sides of the core, the carton having at least one surface thermoformed to deviate from the normal plane of the surface.

The invention further provides carton blanks for the fabrication of these cartons.

DESCRIPTION OF THE PREFERRED EMBODIMENTS

As indicated above, foams which can be used in the cartons of the instant invention should have an elongation of less than 50% and preferably less than 8%. Polystyrene foams having an elongation of about from 2.5 to 8.0% are especially preferred. By elongation is meant the linear extension of the foam at break. In addition, the foam should be prepared from a polymer having a tensile modulus of greater than 150,000 p.s.i., as determined by ASTM D–882–64T.

Oriented styrene polymer foams which can be used can be prepared from polymers of styrene and its methyl derivatives, for example, poly(alpha-methylstyrene), poly(2,4-dimethylstyrene), as well as copolymers and blends of styrenes such as poly(styrene-butadiene), and poly(acrylonitrile-styrene). In general, for most packaging applications, the oriented foam portion of the laminated structure will have a thickness of about from 10–100 mils, and preferably about from 12–38 mils. In those embodiments of the instant invention using an oriented polystyrene foam, the foam should have a density of about from 0.5 to 20 pounds per cubic foot, and a density of about from 5–10 pounds per cubic foot has been found to be particularly well suited for packaging purposes. Such polystyrene foams can be prepared by techniques well-known to those skilled in the art as described in detail in Plastics Technology, August 1966, pp. 41–44, and September 1966, pp. 46–49. Extruded, oriented polystyrene foams suitable for use in the instant invention are also commercially available from Sinclair-Koppers of Pittsburgh, Pennsylvania, and Plastics Systems Incorporated, Carlstadt, New Jersey.

It is important to the performance of the carton materials that the foam be oriented by a biaxial stretching of the foam about from 2–12 times. Because of the widespread use of tubular extrusion and expansion in the preparation of foam sheets, it has been found economically desirable to use foams having been stretched about 5 times in the transverse direction and about 3–12 times in the machine direction.

The film laminated to the foam core in the structures of the instant invention should be thermoformable at temperatures of about from 50° C. to 230° C. and should have a tensile modulus of at least 150,000 p.s.i. These films can be prepared from a wide variety of polymers, including, for example, homopolymers and copolymers of polyvinyl chloride biaxially oriented at least 2× in each direction; polypropylene; polyesters such as polyethylene terephthalate; acrylonitrile-butadiene-styrene polymers; polystyrene and modified polystyrenes, e.g., poly(alpha-methylstyrene) and poly(2,4-dimethylstyrene); oriented polyethylene; polyamides, polycarbonates and modified acrylic interpolymers. For certain uses requiring a product of great flexibility and softer hand, ethylene polymers and and copolymers are particularly useful. However, in general, films formed from polyvinyl chloride or polypropylene are preferred for use in the structures of the instant invention because of their excellent thermoformability and drawability. Unplasticized polyvinyl chloride film is particularly preferred, these films generally having a tensile modulus of from 330,000 to 385,000 p.s.i. Polyvinyl chloride copolymers that can be used include those having from 6 to 8% propylene or vinyl acetate comonomer. These copolymers have tensile moduli of 260,000 to 300,000 p.s.i.

In order that the laminates be creasable, it has been found that the percent elongation of the outer films at their breaking point should be greater than the function $(t/R)$;

wherein $t$ is the thickness of the film and R is the radius of the creasing edge, e.g., the knife or rule. In general, the films should have an elongation of greater than about 5%.

The elongation of a particular film used is generally measured according to ASTM–D882–Method A. It should be noted, however, that the elongation of the film should be measured at the strain rate experienced in the actual creasing operation, which may exceed the 100%/minute strain rate used in the above ASTM test.

The bond strength of the laminates is an important feature in their commercial utility, and the strength of the film-foam bond should be at least 250, and preferably 300 grams per lineal inch. Inadequate bond strength can result in unsatisfactory cutting, creasing and thermoforming performance. In addition, poor bond strength diminishes the utility of the laminates for reusable hinges and substantially decreases their structural strength. Laminates of the requisite bond strength can be prepared by adhesive or non-adhesive bonding techniques, as are fully discussed in parent application Ser. No. 848,206, filed Aug. 7, 1969, hereby incorporated by reference.

The carton blanks of the instant invention can be prepared from the laminar foam structures by cutting and creasing with conventional commercial carton-forming apparatus. When creasing with high speed equipment, however, care should be taken to provide laminates with outer films having a percent elongation falling within the requirements previously indicated.

An important feature of the carton blanks and folding cartons of the instant invention is that at least one surface thereof, as defined by the folding creases, be thermoformed to deviate from the normal plane of the surface. The foam laminates used in the preparation of the structures of the instant invention can be readily thermoformed to depths of 3 inches and greater at draw ratios (diameter/depth) of about from 3/1 to 1/3. The foam laminates can be thermoformed before or after cutting and creasing the blanks, to suit the convenience of the particular manufacturing operation. In general, however, it is preferred that the thermoforming be done before creasing, to avoid reexpansion of the creased areas.

Applicable thermoforming techniques include those generally used by those skilled in the art as described in Plastics Technology, November 1966, pages 54–58, hereby incorporated by reference. For example, the carton blanks can be preheated with infrared heaters to a surface temperature of about 120° C. and a core temperature of 85° C. The laminate can then be forced into a mold or die using vacuum assist and/or pressure. Alternatively, the carton blank can be thermoformed using embossing rolls. When embossing rolls are used, either the roll or the carton blank should be heated prior to forming, or both.

The surfaces of the carton blank can be thermoformed outwardly or inwardly with respect to the erected carton and the thermoforming can be present on any and preferably all of the carton surfaces. The particular pattern or shapes thermoformed into the surface is not critical to the instant invention and can include, for example, various decorative designs as well as functional shapes designed to stabilize a packaged article within the folded carton. Other thermoformed shapes can provide pour spouts and hand grips in the carton.

The thermoformed shapes of the carton blanks and folding cartons according to the instant invention have a surprising beneficial effect on the structural rigidity of the folding cartons. It has been found that the thermoforming of any design, pattern or form into the surface of the carton or carton blank will increase the strength and stability of the carton. While the surprising effect of the thermoforming is not fully understood, it is believed to result at least in part from the increase in the functional thickness of the carton walls, even though the actual width of the carton walls be uniform throughout the structure. Thus, carton blanks and folding cartons are provided having a strength, stability and structural integrity far greater than cartons of flat thermoplastic material.

We claim:
1. A folding carton consisting essentially of a laminated structure comprising
    (a) a core of oriented closed cell foam having been biaxially stretched about from 2 to 12 times in each of two mutually perpendicular directions, the foam having an elongation of less than about 50% and consisting essentially of styrene polymer having a tensile modulus greater than 150,000 p.s.i., and
    (b) thermoplastic film having a tensile modulus greater than 150,000 p.s.i. and thermoformable within a temperature of about from 50° to 230° C., bonded to both sides of the core,
the carton having at least one surface thereof thermoformed to deviate from the normal plane of the surface.

2. A cut and creased folding carton blank consisting essentially of a laminated structure comprising
    (a) a core of oriented closed cell foam having been biaxially stretched about from 2 to 12 times in each of two mutually perpendicular directions, the foam having an elongation of less than about 50% and consisting essentially of styrene polymer having a tensile modulus greater than 150,000 p.s.i., and
    (b) thermoplastic film having a tensile modulus greater than 150,000 p.s.i. and thermoformable within a temperature of about from 50° to 230° C., bonded to both sides of the core,
the carton blank having the surface thereof thermoformed to deviate from the normal plane of the surface.

References Cited
UNITED STATES PATENTS 2,770,406  11/1956  Lane ---------------- 161—161

WILLIAM J. VAN BALEN, Primary Examiner

U.S. Cl. X.R.

161—99, 117, 161, 254

PO-1050
(5/69)

UNITED STATES PATENT OFFICE
CERTIFICATE OF CORRECTION

Patent No. 3,649,437          Dated March 14, 1972

Inventor(s) Leon Edward Wolinski and Roland G. Harris

It is certified that error appears in the above-identified patent and that said Letters Patent are hereby corrected as shown below:

At column 1, line 10 "November 9, 1971" should read -- November 9, 1988 --

Signed and sealed this 5th day of September 1972.

(SEAL)
Attest:

EDWARD M. FLETCHER, JR.
Attesting Officer

ROBERT GOTTSCHALK
Commissioner of Patents